United States Patent
Masaki et al.

[11] Patent Number: 5,877,607
[45] Date of Patent: *Mar. 2, 1999

[54] ELECTRIC MOTOR CONTROLLER CAPABLE OF PERFORMING STABLE CURRENT CONTROL DURING LOAD DISTURBANCE AND/OR A REGENERATING MODE

[75] Inventors: Ryoso Masaki; Yuusuke Takamoto; Taizou Miyazaki, all of Hitachi; Satoru Kaneko; Sanshiro Obara, both of Naka-gun, all of Japan

[73] Assignee: Hitachi, Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 705,597
[22] Filed: Aug. 30, 1996

[30] Foreign Application Priority Data

Sep. 4, 1995 [JP] Japan ................... 7-226238

[51] Int. Cl.$^6$ ........................... H02P 7/00
[52] U.S. Cl. .............................. 318/807
[58] Field of Search ............. 318/139, 798–822, 318/432; 180/197, 142, 246, 170; 364/424.05, 426.03, 426.02, 426.04; 363/74, 123, 124, 131, 132

[56] References Cited

U.S. PATENT DOCUMENTS

| | | | |
|---|---|---|---|
| 5,038,092 | 8/1991 | Asano et al. | 318/811 |
| 5,182,508 | 1/1993 | Schauder | 318/801 |
| 5,504,404 | 4/1996 | Tamaki et al. | 318/432 |
| 5,534,764 | 7/1996 | Masaki et al. | 318/139 X |
| 5,589,754 | 12/1996 | Heikkila | 318/805 |
| 5,629,597 | 5/1997 | Imanaka | 318/805 |
| 5,659,235 | 8/1997 | Yamada et al. | 318/801 |

FOREIGN PATENT DOCUMENTS

| | | |
|---|---|---|
| 59-169369 | 9/1984 | Japan . |
| 5-153705 | 6/1993 | Japan . |

*Primary Examiner*—Jonathan Wysocki
*Attorney, Agent, or Firm*—Antonelli, Terry, Stout & Kraus, LLP

[57] ABSTRACT

In a controller for an electric vehicle, a voltage current phase difference calculating circuit calculates a vector phase $\theta_c$ from a voltage command value and the primary current of an alternating current motor. The vector phase $\theta_c$ is input to a second voltage command circuit which calculates a second d-axis voltage command value and a second q-axis voltage command value using the vector phase $\theta_c$ and d-axis and q-axis current differences. By correcting the voltage command value using the second d-axis and second q-axis voltage command values, the stability of the current control system is improved. By controlling the electric vehicle using such a system, a stable current control can be attained even when the electric vehicle is driven under a regenerative running state or a weak magnetic field control state.

36 Claims, 11 Drawing Sheets

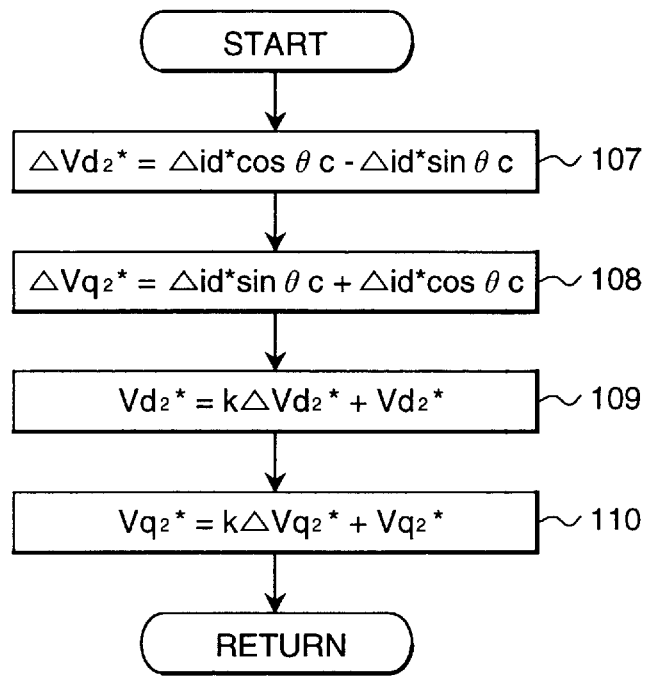
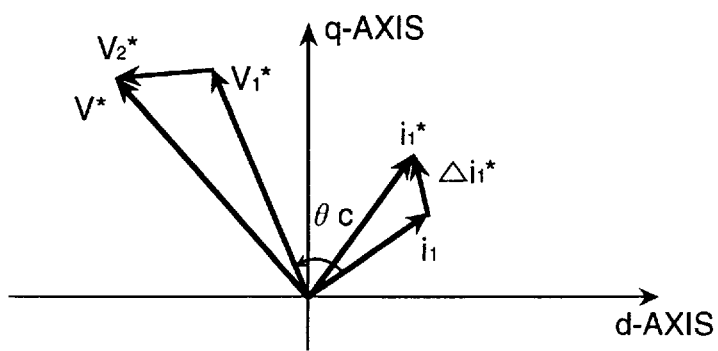

ELECTRIC MOTOR CONTROLLER CAPABLE OF PERFORMING STABLE CURRENT CONTROL DURING LOAD DISTURBANCE AND/OR A REGENERATING MODE

BACKGROUND OF THE INVENTION

The present invention relates to an electric vehicle controller and, more particularly, the invention relates to an electric vehicle controller which is suitable for use in an automobile which is required to frequently perform regeneration of the electrical power source and to have an energy saving driving capability.

As for power controllers for controlling three-phase alternating current, there are a control method in which current is fed back using a stationary coordinate system and a control method in which current is fed back using a rotating coordinate system agreeing with a magnetic flux in an alternating current motor. As for these current control systems, the former method has been widely used because it does not require complex calculation, such as a transformation of the coordinate system. An example of such a current control method for an electric vehicle is disclosed in Japanese Patent Application Laid-Open No. 5-153705. On the other hand, since the latter method can deal with current as a direct current value, the latter method is suitable for a digital controller which has a limitation in response due to the sampling time. Especially, the latter method has an advantage when the primary frequency of the alternating current motor is several hundreds Hz or higher and a digital control method is employed.

In regard to electric vehicles, since one of the most important problems is to attain small size and light weight, a most advantageous controller employs a totally automated digital method using a single chip micro-computer. As for methods of attaining a small sized motor, a high speed motor is advantageous, and accordingly a high primary frequency is required. Therefore, it is expected that the latter method of current control will be widely used in the future.

A second control method known in the art is proposed in Japanese Patent Application Laid-Open No. 59-169369. According to this method, current control can be performed more stably than the previous technology known in the art by integrating a q-axis voltage with a d-axis current difference and integrating a d-axis voltage with a q-axis current difference corresponding to an angular frequency used in the transformation of the coordinate system, respectively. However, there is a problem with this in that the control response largely changes due to a large change in the width of the integral gain, since the angular frequency ω largely varies. For example, in a case where the rotation of a motor rapidly changes from a high speed state of 10000 rpm to a low speed state of 100 rpm, correction of a voltage integration value calculated during the high speed-state requires a correction time which is 100 times as long as the correction time required in a normal state.

For this reason, most products generally employ the second conventional control method in which a motor can be driven in the ordinary operating condition without a problem.

However, a motor controller for an electric vehicle is subject to the following conditions compared to a common motor controller. (1) Regenerative operation is sometime performed for a long time period. (2) Comparatively weak magnetic field control is often performed during low driving torque because improvement of the efficiency is most important in an electric vehicle. For example, the motor is driven under the above condition when the vehicle runs on a very long descending road. In the current control method described in the above-mentioned second conventional technology, the stability of the control system is reduced when the vehicle is running on a descending road at a high speed.

This phenomenon can be explained as follows. FIG. 15 is a vector diagram showing a voltage and a current of an induction motor when an electric vehicle runs in a regenerative driving state, under a weak magnetic field control and at a high speed. Considering a vector diagram in connection with integral operation, an integral correction vector $V_{2*}$ is additionally applied to the difference between a current command vector $i_{1*}$ and a current vector $i_{1*}$, that is, a current difference vector $\Delta i_{1*}$ in the same direction. In this case, since an applied voltage vector $\underline{V^*}$ is smaller than an initial voltage command vector $V_{1*}$, the current vector $i_1$ does not approach the current command vector $i_{1*}$, but often moves far from the current command vector $i_{1*}$. It has been determined that there are some cases where the stability of a controller for an electric vehicle is extremely degraded particularly when the running condition of the vehicle satisfies the three conditions of high speed, regeneration and weak magnetic field control at the same time.

SUMMARY OF THE INVENTION

An object of the present invention is to provide a controller for an electric vehicle having a system capable of stably performing current control even in the presence of a load disturbance and/or during a regenerating mode.

Another object of the present invention is to provide an electric vehicle which has a better acceleration characteristic in response to an accelerator operation.

The object of the present invention can be attained by providing an electric vehicle controller comprising an alternating current motor for driving a vehicle, an electric power converter for generating electric power supplied to the alternating current motor, a current command value generator for calculating a d-axis current command value and a q-axis current command value perpendicular to the d-axis current command value for generating a magnetic field of the alternating current motor, and a current controller for controlling the electric power converter by feeding back a d-axis current and a q-axis current perpendicular to the d-axis current of the alternating current motor and calculating a d-axis voltage command value from a d-axis current difference between the d-axis current command value and the d-axis current and calculating a q-axis voltage command value from a q-axis current difference between the q-axis current command value and the q-axis current, respectively, wherein the current controller comprises voltage vector correcting means for correcting the d-axis voltage command value and the q-axis voltage command value by calculating a correct d-axis voltage command value and a correct q-axis voltage command value from the d-axis current difference and the q-axis current difference using a vector phase based on a driven state of the alternating current motor.

It is preferable that an electric vehicle controller in accordance with the present invention comprises a feed-forward voltage means for pre-calculating an applied voltage to be generated based on a d-axis current command value and a q-axis current command value.

The controller calculates a d-axis current command value and a q-axis current command value which is perpendicular to the d-axis current command value for generating a magnetic field of the alternating current motor, and feeds back a d-axis current value and a q-axis current value which is perpendicular to the d-axis current value of the alternating current motor, and then calculates a d-axis voltage command value from a d-axis current difference between the d-axis current command value and the d-axis current value and calculating a q-axis voltage command value from a q-axis current difference of the q-axis current command value and the q-axis current value.

The electric power converter is driven using these command values to control the alternating current motor. Therein, a driven state is detected from an applied voltage and a primary current of the alternating current motor, and a vector phase based on the driven state is calculated. This vector phase is a phase of correct voltage for correcting the current difference so that the current difference stably becomes zero. For this purpose, a correct d-axis voltage command value and a correct q-axis voltage command value are calculated so as to generate a correct voltage command value which has a phase advancing to the d-axis current difference and the q-axis current difference, this advancement being determined by the obtained vector phase.

It is particularly important that the phase of the voltage is varied corresponding to the driven state of the motor with information about this state being provided by factors such as the applied voltage and the primary current. The applied voltage is corrected by adding these voltages to the d-axis voltage value and the q-axis voltage value, respectively. By doing so, since the applied voltage is added to a voltage having a direction suitable for the driven state of the motor, the current difference can be stably converged even under a special load condition of the electric vehicle, such as during a regenerative running state, during a high speed running state, or under a weak magnetic field control, and the primary current can be made to agree with the command value in a steady state condition. Therefore, the current control characteristic performed using a magnetic flux coordinate system can be made more stable.

Further, by inputting an applied voltage calculated by an equivalent circuit for a steady state condition using the d-axis current command value and the q-axis current command value as a feed-forward signal to the controller in advance, the normal current control calculation and the newly added correcting voltage calculation generate a voltage for compensating the current difference. Thereby, the response characteristic and the time required for converging to a steady state condition are shortened.

BRIEF DESCRIPTION OF THE DRAWINGS

FIG. 4 is a flow chart for obtaining a second voltage command from a vector phase $\Theta_c$ in the second voltage command circuit (20) of FIG. 1.

FIG. 5 is a vector diagram showing the relationship between a second voltage command value and a current difference calculated in FIG. 4.

DETAILED DESCRIPTION OF THE PREFERRED EMBODIMENTS

Figure 1:
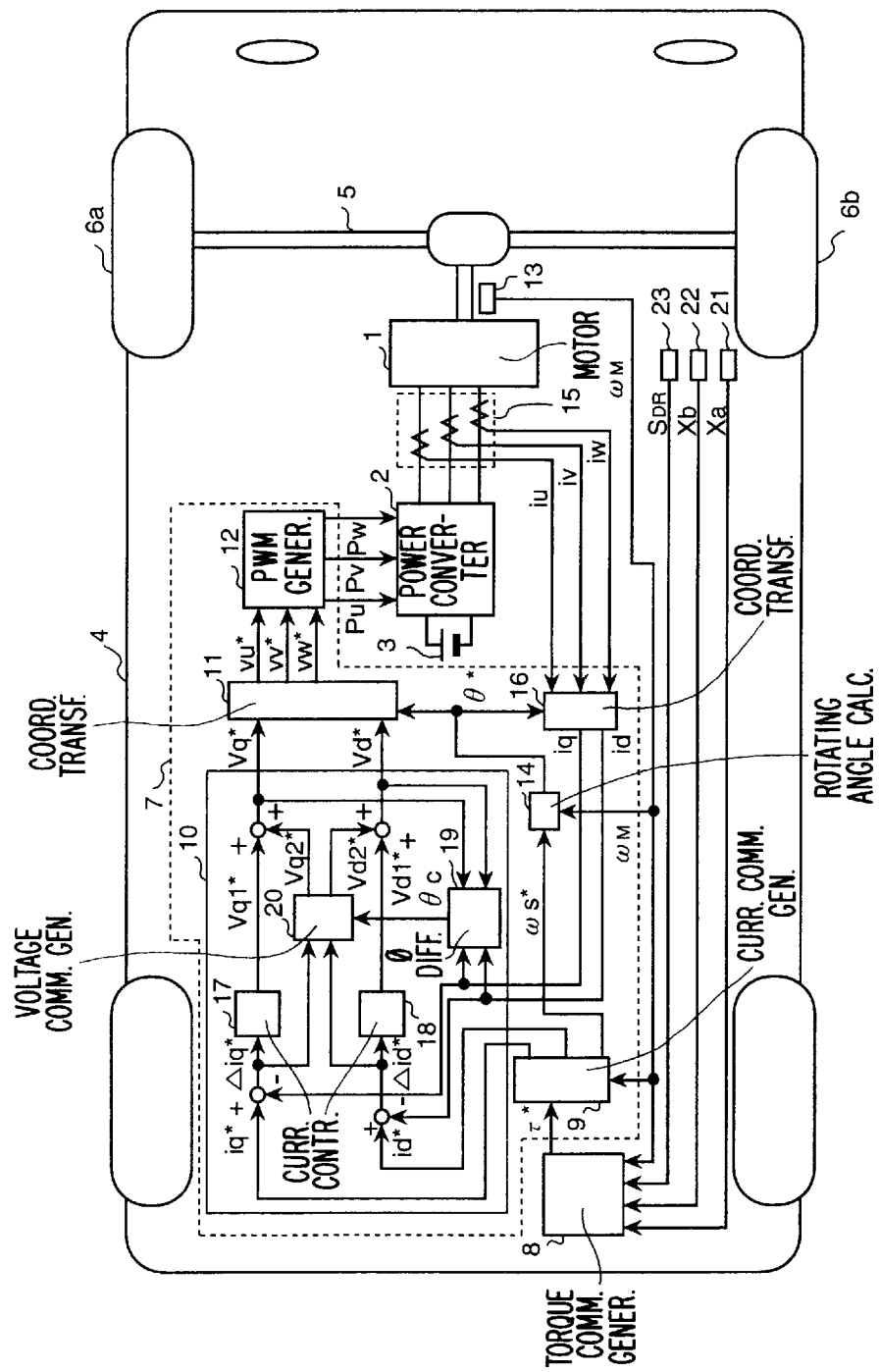
FIG. 1 is a schematic diagram of a control circuit for an electric vehicle mounting an embodiment of a controller in accordance with the present invention.

An embodiment of the present invention will be described in detail below, referring to FIG. 1. FIG. 1 shows an electric vehicle in which a three-phase electric power converting circuit 2 controls an induction motor 1 to drive a car body 4. The electric power converting circuit 2 converts energy of an electric source 3 into a three-phase alternating current voltage, which is used by a controller 7 to drive the motor 1. The torque of the motor is transmitted to tires 6a, 6b through a wheel shaft 5 to drive the car body 4. A driver operates an accelerator 21, a brake 22 and an exchange switch 23. A torque command generator 8 receives an actuation amount $X_a$ of the accelerator 21, an actuation amount $X_b$ of the brake 22, a switching signal $S_{DR}$ of the exchange switch 23 indicating forward running, reverse running and stopping, and a motor speed $\omega_M$ the induction motor 1 output from a speed detector 13, and calculates a torque command value $\tau^*$ to be output to the induction motor 1 based on these signals. In the controller 7, a current command generating circuit 9 receives the torque command value $\tau^*$ and calculates a d-axis current command value $i_{d^*}$ and a q-axis current command value $i_{q^*}$ perpendicular to the d-axis current command value on a rotating coordinate system which agrees with the magnetic flux of the induction motor through a well-known vector control method. The product of the d-axis current command value $i_{d*}$ and the q-axis current command value $i_{q*}$ has a value proportional to the torque command value $\tau^*$. A slip angular frequency command value $\omega_{s*}$ of the induction motor 1 obtained from the d-axis current-command value $i_{d*}$ and the q-axis current command value $i_{q*}$ is also output from the current command generating circuit 9.

The d-axis current command value $i_{d*}$ and the q-axis current command value $i_{q*}$ are input to a current control circuit 10 which outputs a d-axis voltage command value $v_{d*}$ and a q-axis voltage command value $v_{q*}$ through current control calculation to be described later. The d-axis voltage command value $v_{d*}$ and the q-axis voltage command value $v_{q*}$ are values on the rotating coordinate system and the three-phase alternating current voltage command values $v_{u*}$, $v_{v*}$, $v_{w*}$, on a stationary coordinate system are obtained by a rotating angle command value $\Theta^*$ in a coordinate transformation circuit 11. The rotating angle command value $\Theta^*$ is calculated in a rotating angle calculating circuit 14 through the following process. A primary angular frequency $\omega_1$ is calculated by adding a motor speed $\omega_M$ obtained from the speed detector 13 to the slip angular frequency command value $\omega_{s*}$, and then the rotating angle command value $\Theta^*$ can be obtained by integrating the primary angular frequency $\omega_1$. Therefore, the rotating angle command value $\Theta^*$ is a command value for a phase of the rotating magnetic flux of the induction motor 1. Then, a PWM generating circuit 12 compares the three-phase alternating current voltage command values $v_{u*}$, $v_{v*}$, $v_{w*}$ with a triangular carrier wave signal fc to obtain PWM signals $P_U$, $P_V$, $P_W$ for respective phases. The electric power converter 2 is controlled by the PWM signals $P_U$, $P_V$, $P_W$ and converts the electric power of the electric source 3 into three-phase alternating current electric power to control the induction motor 1. The amount of each phase flowing in the induction motor 1 is detected by a current sensor 15, converted from the stationary coordinate system to the rotating coordinate system by the rotating angle command value $\Theta^*$ in the coordinate transformation circuit 16 to output a d-axis current value $i_d$ and a q-axis current value $i_q$. These current values are input to the current controlling circuit 10.

The current controlling circuit 10, characterizing the present invention, will be described below in detail. The difference between the d-axis current command value $i_{d*}$ and the d-axis current value $i_d$ and the difference between the q-axis current command value $i_{q*}$ and the q-axis current value $i_q$ are calculated to obtain a d-axis current difference $\Delta i_{d*}$ and a q-axis current difference $\Delta i_{q*}$. A d-axis current control circuit 18 calculates a first d-axis voltage command value $v_{d1*}$ from the d-axis current difference $\Delta i_{d*}$ through proportional calculation or proportional integral calculation. Similarly, a q-axis current control circuit 17 calculates a first q-axis voltage command value $v_{q1*}$ from the q-axis current difference $\Delta i_{q*}$. A voltage current phase difference calculating circuit 19 calculates a voltage current phase difference $\theta_c$ from the d-axis voltage command value $v_{d*}$, the q-axis voltage command value $v_{q*}$, the d-axis current value $i_d$ and the q-axis current value $i_q$.

Figure 2:
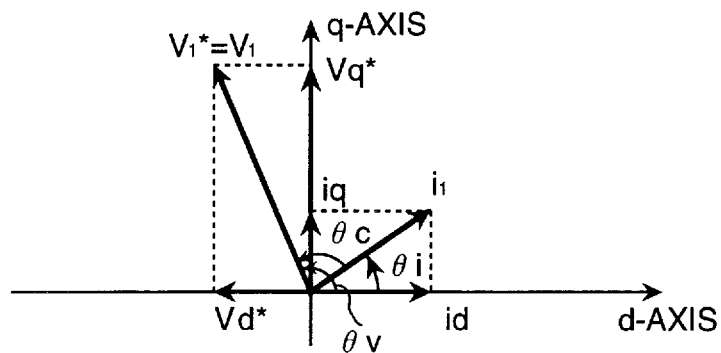
FIG. 2 is a vector diagram showing the relationship between an applied voltage and a primary current of an induction motor used in the present invention on the d-q coordinate system.
Figure 3:
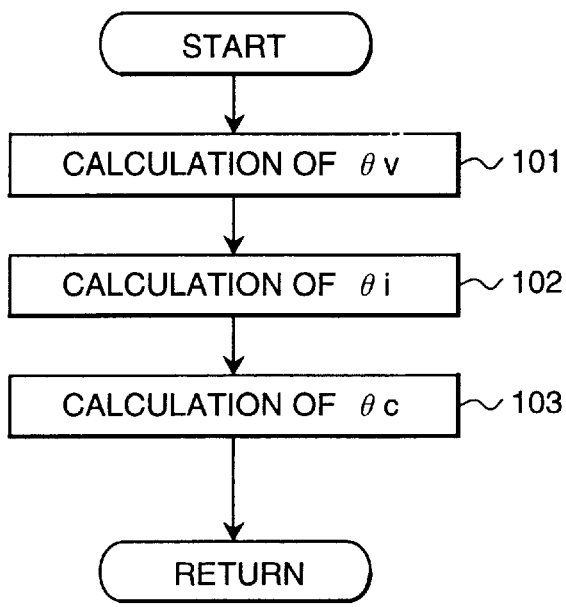
FIG. 3 is a flow chart for calculating a vector phase $\Theta_c$ in the voltage current phase difference calculation circuit (19) of FIG. 1.

FIG. 2 is a vector diagram showing an applied voltage vector $v_1$ and a primary current vector $i_1$ of an induction motor 1. In this figure, since it is assumed that the applied voltage vector $v_{1*}$ nearly agrees with a primary voltage command vector, $V_{1*}$, a d-axis voltage command value $v_{d*}$ and a q-axis voltage command value $v_{q*}$ are used. A voltage current phase difference $\Theta_c$ is calculated according to the flow chart of FIG. 3. It can be understood from the vector diagram of FIG. 2 that a voltage phase $\Theta_v$ can be calculated in Step 101 using triangular functions from a d-axis voltage command value $v_{d*}$ and a q-axis voltage command value $v_{q*}$. Similarly, in Step 102, a current phase $\Theta_i$ of a primary current vector $i_1$ can be obtained from a d-axis current value $i_d$ and a q-axis current value $i_{q*}$. Therefore, a voltage current phase difference $\Theta_c$ can be calculated from the difference between the voltage phase $\Theta_v$ and the current phase $\Theta_i$, in Step 103. Hereinafter, the calculated phase difference $\Theta_c$ will be referred to as a vector phase.

The vector phase $\Theta_c$ is input to a second voltage command circuit 20, and processing of the flow chart shown in FIG. 4 is executed using the d-axis current difference $\Delta i_{d*}$, the q-axis current difference $\Delta i_{q*}$ and the vector phase $\Theta_c$. In Steps 107 and 108, a d-axis integral input value $\Delta V_{d2*}$ and a q-axis integral input value $\Delta V_{q2*}$ are calculated through the calculation of FIG. 4. Next, in Steps 109 and 110, a second d-axis voltage command value $v_{d2*}$ and a second q-axis voltage command value $v_{q2*}$ are calculated by multiplying with a gain and integrating each of the d-axis integral input value $\Delta V_{d2*}$ and the q-axis integral input value $\Delta V_{q2*}$.

The meaning of these calculations is that the second voltage command vector $v_{2*}$ is integrated in a phase direction advancing from the phase direction of the current difference vector $\Delta i_{1*}$ by the vector phase $\Theta_c$. This relationship is shown in FIG. 5. In a case where the second voltage command circuit 20 is not used, a primary current vector $i_1$ is generated in response to the first voltage command vector $v_{1*}$. Therefore, a second voltage command vector $v_{2*}$ for making the primary current vector $i_1$ agree with the current command vector $i_{1*}$ is calculated without disturbing the relationship with the load of the induction motor 1. By adding the second voltage command vector $v_{2*}$ to the voltage command vector $v_{1*}$, making the primary current vector agree with the current command vector can be easily obtained in a steady state. Particularly, by doing so, it is possible to provide a current control system which has a better stable characteristic even during a regenerative state. In other words, in a case where the current control method is applied to an electric vehicle, there is an advantage when the vehicle runs on a long descending load. The torque command generator 8 calculates a torque command value $\tau^*$ so as to perform regenerative control in which the kinetic energy is recovered as electric power for the battery. Further, in an electric vehicle, weak magnetic field control is actively performed depending on the motor torque in order to decrease energy loss to as low a value as possible. Therefore, high stability can be maintained during regenerative running as well as during power running, and the control method is most effective during regenerative running.

As described above, according to this embodiment, it is possible to provide an electric vehicle which is capable of always performing stable current control at any driving state.

Figure 6:
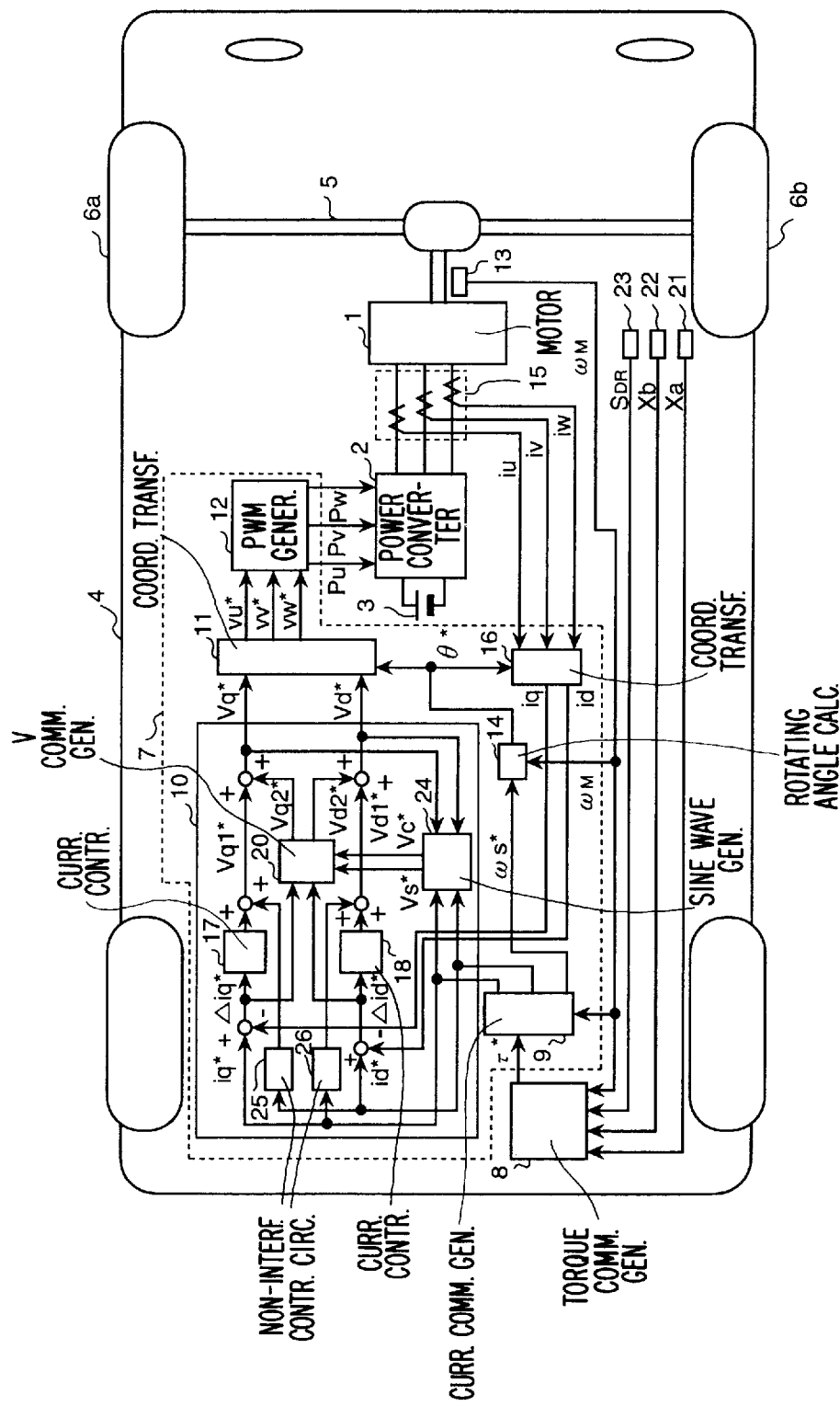
FIG. 6 is a schematic diagram of a control circuit for an electric vehicle embodiment of a controller in accordance with the present invention.

FIG. 6 shows another embodiment of a controller suitable for an electric vehicle. The basic construction is the same as that of the embodiment of FIG. 1. Different points from the embodiment of FIG. 1 are that non-interference control circuits 25 and 26 are added and a sinusoidal wave generating circuit 24 is provided instead of the voltage current phase difference calculating circuit 19.

These differences will be described below. The non-interference control circuits 25 and 26 pre-calculate a voltage vector $v_{3*}$ essentially required for obtaining a d-axis current command value $i_{d*}$ and a q-axis current command value $i_{q*}$, and apply the voltage in a feed-forward direction. In more detail, the non-interference control circuits 25 and 26 calculate the following values and add the values to the d-axis voltage command value and the q-axis voltage command value, respectively.

$$v_{q3*} = k_3 \omega_M i_{d*} \quad (1)$$

$$v_{d3*} = k_2 \omega_M i_{q*} \quad (2)$$

In the above equations, the primary angular frequency $\omega_1$ of the electric power converter 2 may be used instead of the motor speed $\omega_M$.

The sinusoidal wave generating circuit 24 calculates a cosine wave signal $v_{c*}$ proportional to $\cos\theta_c$ and a sine wave signal $v_{s*}$ proportional to $\sin\theta_c$ using the d-axis voltage command value $v_{d*}$, the q-axis voltage command value $v_{q*}$, the d-axis current command value $i_{d*}$ and the q-axis current command value $i_{q*}$ through the following equations.

$$v_{c*} = v_{d*} i_{d*} + v_{q*} i_{q*} \quad (3)$$

$$v_{s*} = v_{d*} i_{d*} - v_{q*} i_{q*} \quad (4)$$

Here, the d-axis current command value $i_{d*}$ and the q-axis current command value $i_{q*}$ are used, whereas the d-axis current value $i_d$ and the q-axis current value $i_q$ obtained from the current sensors are used in the embodiment of FIG. 1. One of the advantages of this embodiment is that the d-axis current command value $i_{d*}$ and the q-axis current command value $i_{q*}$ are not affected by current fluctuation nor by the current sensors.

The second voltage command circuit 20 performs calculations equivalent to the calculations in FIG. 4 using $v_{c*}$, $v_{s*}$. That is, the calculations in Steps 107 and 108 of FIG. 4 are performed using $v_{c*}$, $v_{s*}$ instead of using $\cos\theta_c$ and $\sin\theta_c$. Since this method of calculation is simpler than the method of calculation in the embodiment of FIG. 4, there is an advantage in that the calculation time can be shortened when a single chip microcomputer is employed.

Since a non-interference control circuit is added to the current control system in this embodiment, an applied voltage obtained from the equivalent circuit is input in advance and the current control system operates only for an effect of an error of the equivalent circuit or a load change. Therefore, the stability of the current control system can be further improved. Furthermore, since a stable current control system can be constructed with a simple calculation method, a highly reliable electric vehicle can be obtained.

Figure 7:
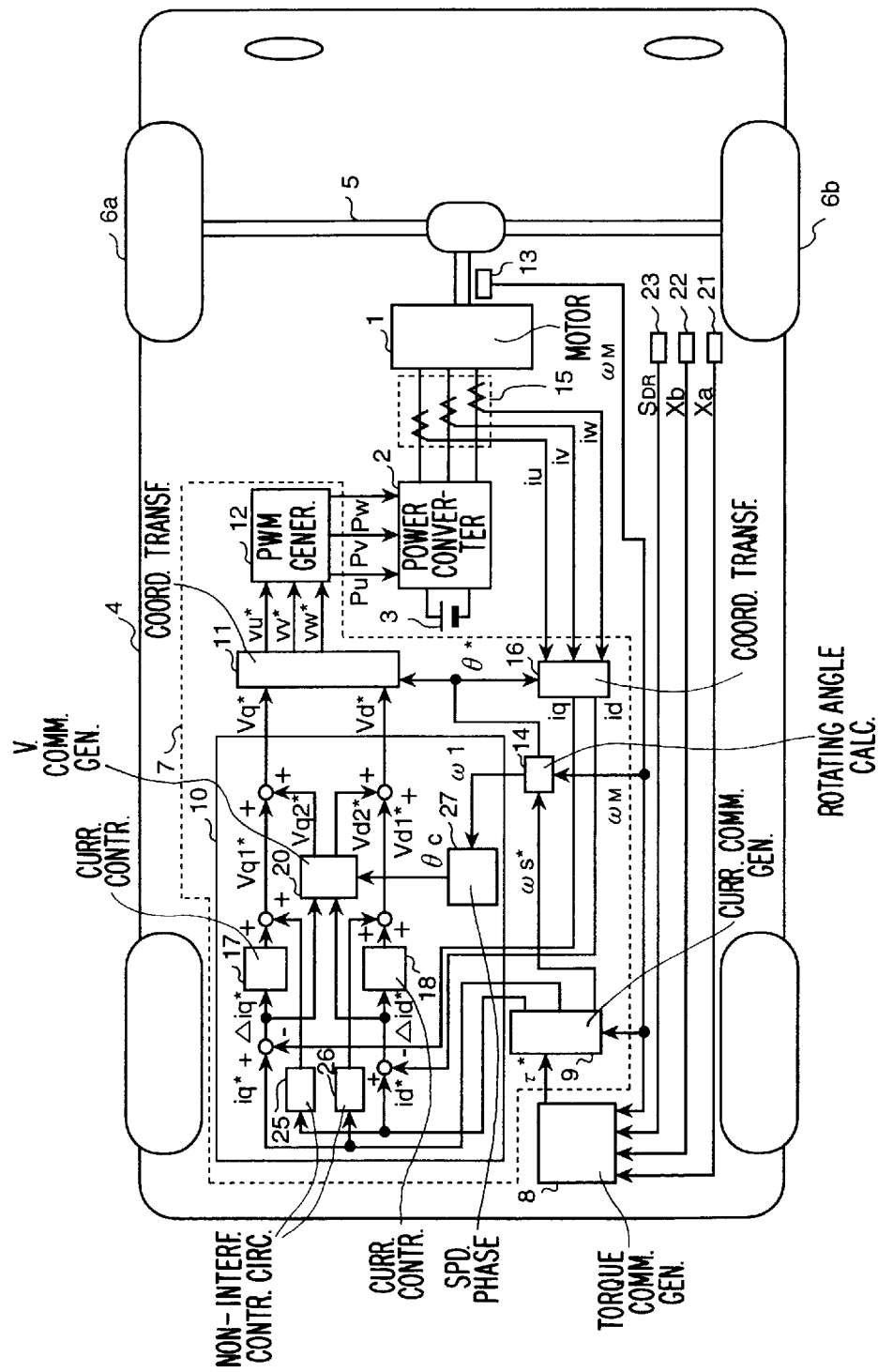
FIG. 7 is a schematic diagram of a control circuit for an electric vehicle mounting another embodiment of a controller in accordance with the present invention in which a vector phase $\Theta_c$ is calculated from a primary angular frequency.
Figure 8:
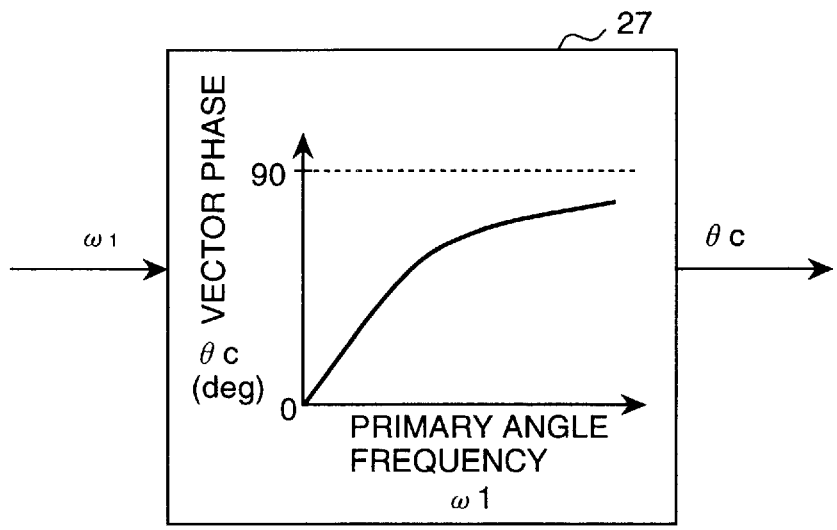
FIG. 8 is a diagram of the speed phase circuit 27 showing the relationship between a primary angular frequency and a vector phase $\Theta_c$.

FIG. 7 shows a control circuit for an electric vehicle displaying another embodiment of a controller in accordance with the present invention in which the vector phase $\Theta_c$ is calculated using a different method. In this embodiment, a speed phase circuit 27 is used instead of the voltage current phase difference calculating circuit 19 of FIG. 1. In this regard, the rotating angle calculating circuit 14 of FIG. 1 calculates a primary angular frequency $\omega_1$ and inputs it to the speed phase circuit 27, and the speed phase circuit 27 calculates a vector phase $\Theta_c$ and outputs it to the second voltage command circuit 20. As illustrated in the diagram showing the characteristic of the processing of the speed phase circuit 27 of FIG. 8, the phase vector can be obtained by accessing a value from a predetermined table. When the primary angular frequency $\omega_1$ is 0 (zero), the vector phase $\Theta_c$ is 0 (zero). When the primary angular frequency $\omega_1$ increases to a higher frequency, the vector phase $\Theta_c$ is calculated so as to approach 90 degrees. Since the second voltage command values $v_{d2*}$ and $v_{q2*}$ corresponding to the current differences $\Delta i_{d*}$ and $\Delta i_{q*}$ are integrated so as to advance the phases in the manner of a vector calculation using the vector phase $\Theta_c$, the second voltage command value is increased in nearly the same direction as the direction of the current difference during low speed running, and the second voltage command value is increased in the same direction of advancing from the direction of the current difference by 90 degrees during high speed running.

According to this embodiment, a current control system which is stable both during a low speed state and a high speed state can be achieved.

Figure 10:
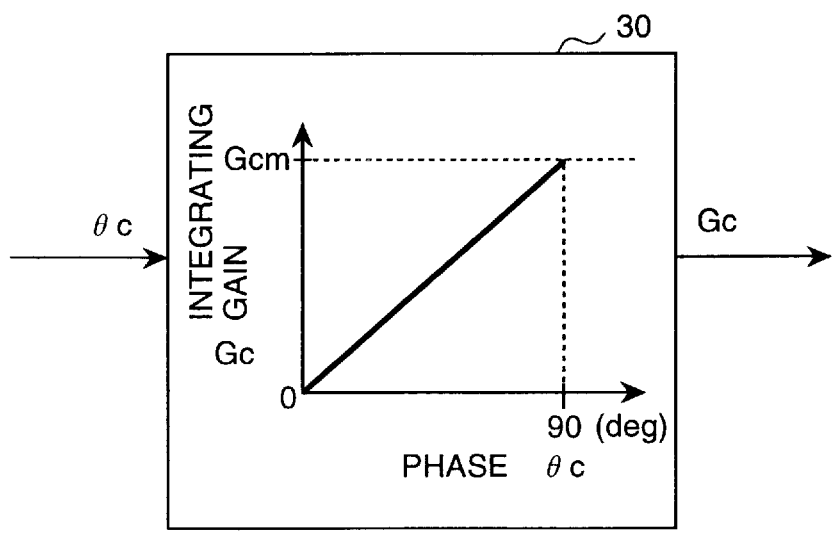
FIG. 10 is a diagram of the integral gain calculating circuit 30 showing the relationship between a vector phase $\Theta_c$ and an integral gain $G_c$.
Figure 9:
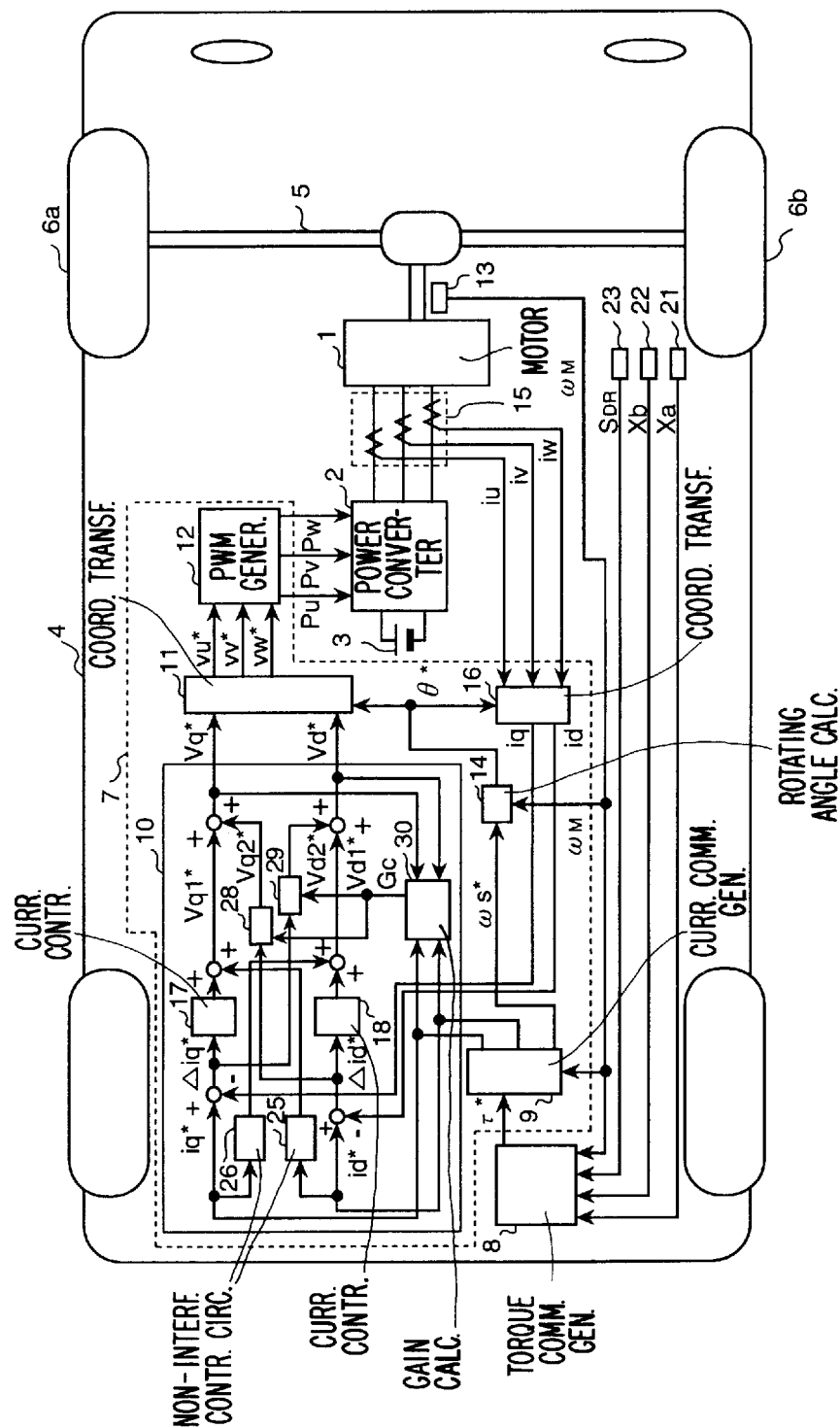
FIG. 9 is a schematic diagram of a control circuit for an electric vehicle mounting a further embodiment of a controller in accordance with the present invention in which a second d-axis voltage command value is obtained from a q-axis current difference and a second q-axis voltage command value is obtained from a d-axis current difference.

FIG. 9 shows a further embodiment of a controller in accordance with the present invention in which an integral gain Gc of a second voltage command value is varied by a vector phase. A difference from the aforementioned embodiments resides in the fact that a second d-axis voltage command circuit 29 and a second q-axis voltage command circuit 28 are used instead of the second voltage command circuit 20. Firstly, the integral gain Gc is obtained by an integral gain calculating circuit 30 using the following method. The method of calculating the vector phase $\theta_c$ from the d-axis voltage command value $v_{d*}$, the q-axis voltage command value $v_{q*}$, the d-axis current value $i_d$ and the q-axis current value $i_q$ may be the same as the method in the embodiment of FIG. 1. Based on this, an integral gain Gc is calculated in an integral gain calculating circuit 30, as shown in FIG. 10. When the vector phase $\theta_c$ is 0 (zero) degree, control is performed only using the first voltage command values $v_{q1*}$ and $v_{d1*}$ obtained in the q-axis current control circuit 17 and the d-axis current control circuit 18. Therefore, it is suitable in this embodiment that the q-axis current control circuit 17 and the d-axis current control circuit 18 are of the proportional integral calculation type, but not of the proportional calculation type. When the vector phase $\theta_c$ is 90 degrees, the integral gain is a maximum integral gain Gcm. Then, a second d-axis voltage command circuit 29 and a second q-axis voltage command circuit 28 calculate a second d-axis voltage command value $v_{d2*}$ and a second q-axis voltage command value $v_{q2*}$ using the following equations.

$$v_{d2*} = Gcm\Delta i_{q*} + v_{d2*} \quad (5)$$

$$v_{q2*} = Gcm\Delta i_{d*} + v_{q2*} \quad (6)$$

By executing these calculations, the stability of the current control is improved since the effect of the second voltage command values $v_{q2*}$ and $v_{d2*}$ becomes large.

By employing this embodiment, it is possible to attain an equivalent current control characteristic by a simpler calculation method than that of the embodiment of FIG. 1.

Figure 11:
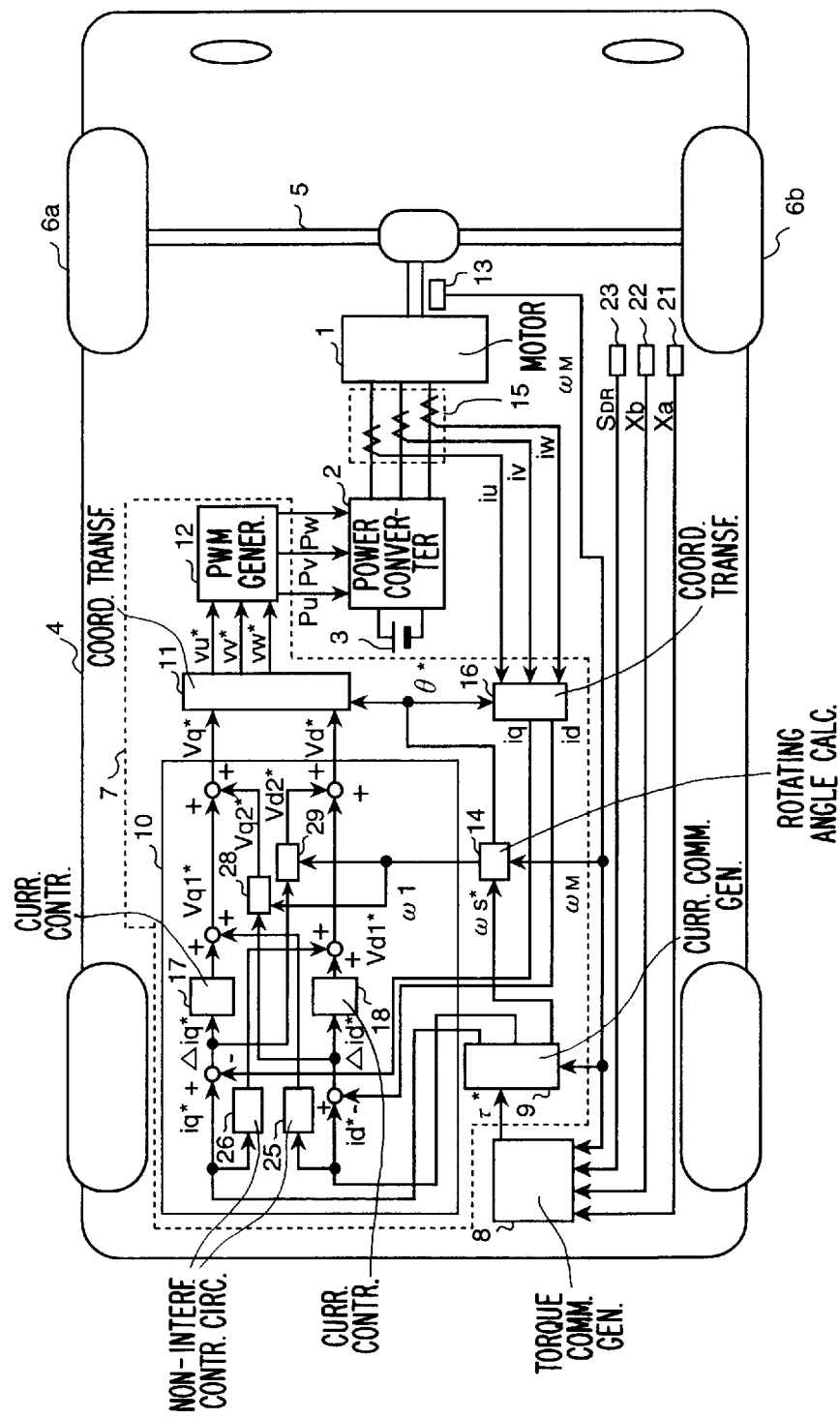
FIG. 11 is a schematic diagram of a control circuit for an electric vehicle mounting a further embodiment of a controller in accordance with the present invention in which a second d-axis voltage command value and a second q-axis voltage command value are varied depending on a primary frequency.

FIG. 11 shows another embodiment wherein the difference from the embodiment of FIG. 9 is that the effect of the second voltage command value is varied depending on the primary angular frequency $\omega_1$. The primary angular frequency $\omega_1$ calculated in the rotating angle calculating circuit 14 is input to the second d-axis voltage command circuit 29 and the second q-axis voltage command circuit 28 to perform the following calculations.

$$v_{d2*} = k_4 \omega_1 (\Sigma \Delta i_{q*}) \quad (7)$$

$$v_{q2*} = k_4 \omega_1 (\Sigma \Delta i_{d*}) \quad (8)$$

By executing these calculations, the current control system is strongly affected by the second d-axis voltage command value $v_{d2*}$ and the second q-axis voltage command value $v_{q2*}$ when the primary angular frequency $\omega_1$ is large.

When the primary angular frequency $\omega_1$ is small, the second d-axis voltage command value $v_{d2*}$ and the second q-axis voltage command value $v_{q2*}$ directly decrease. Therefore, the effects of the first d-axis voltage command value $v_{d1*}$ and the first q-axis voltage command value $v_{q1*}$ become large.

In the case of employing this embodiment, since the second voltage values soon decrease when the motor speed $\omega_M$ is steeply deceased from a high speed, the time until the current at that time is settled to a steady state value can be shortened.

Figure 12:
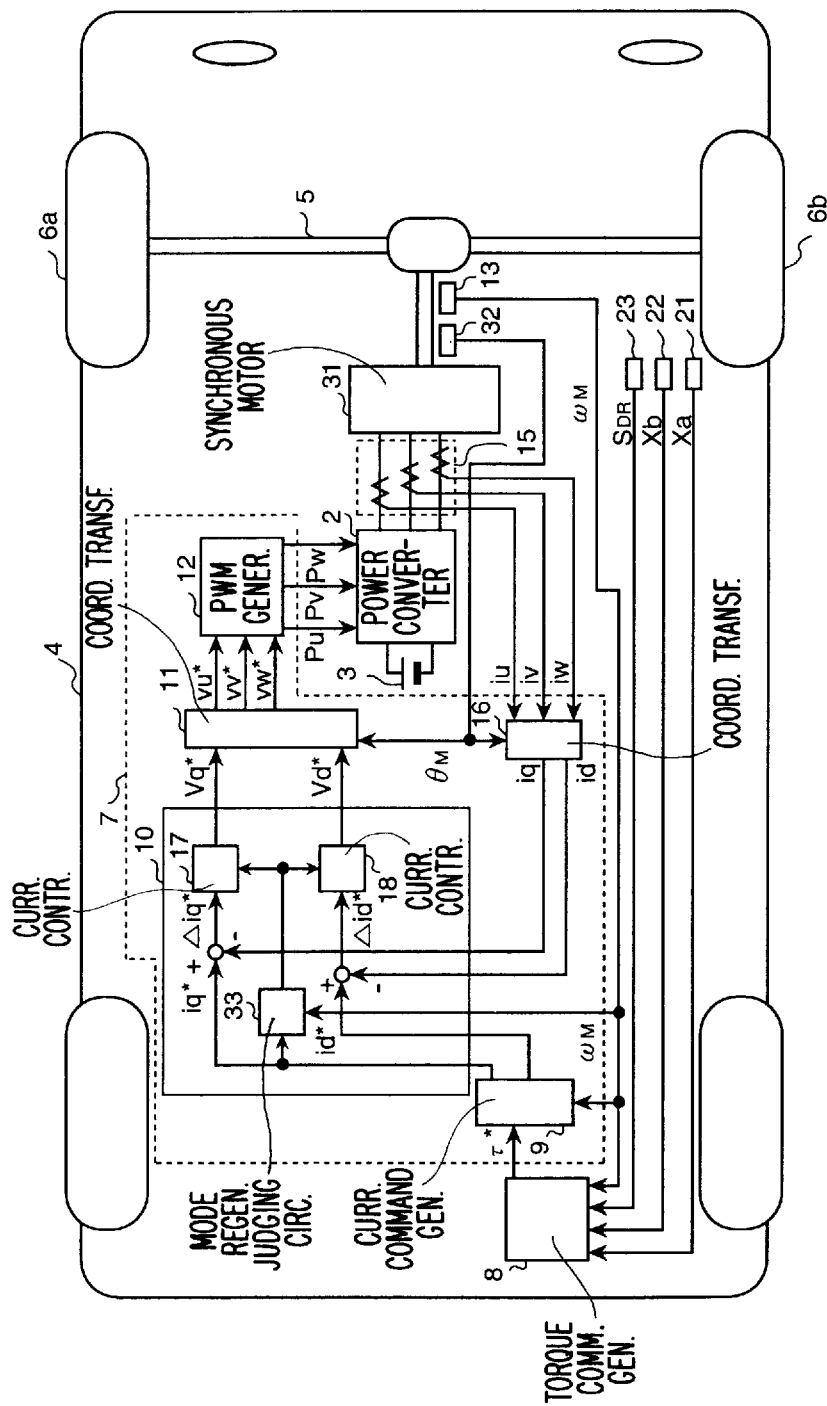
FIG. 12 is a schematic diagram of a control circuit for an electric vehicle mounting another embodiment of a controller in accordance with the present invention in which integration is stopped when the vehicle runs in a regenerative state at a high speed.

FIG. 12 shows an embodiment which can maintain the stability of the current control system by a simpler calculation. In this embodiment, a permanent magnet type synchronous motor 31 is employed instead of an induction motor. A different point of this embodiment is that a magnetic pole position $\theta_M$ obtained from a magnetic pole position detector 32 is used instead of the rotating angle command value $\theta^*$. In FIG. 12, only the q-axis current control circuit 17 and the d-axis current control circuit 18 execute a current control calculation, which is the same as the conventional control method executing a proportional integral calculation. The characteristic of this embodiment is that a mode regeneration judging circuit 33 is added to the control system.

The mode regeneration judging circuit 33 receives a motor speed $\omega_M$ and a q-axis current command value $i_{q*}$. Firstly, it is judged whether the q-axis current command value $i_{q*}<0$. Next, it is judged whether the motor speed $\omega_M$ exceeds a preset high-speed judging speed $\omega_{M0}$ or not. If $i_{q*}<0$ and $\omega_M>\omega_{M0}$, an integral switching signal SW is set to 1 (one) since this means that the electric vehicle is running in a regenerative state and the permanent-magnet type synchronous motor 31 is rotating at a high speed. If not, the integral switching signal SW is set to 0 (zero). The integral switching signal SW is input to the q-axis current control circuit 17 and the d-axis current control circuit 18. There, when the integral switching signal SW is 0, the normal proportional integral calculation is executed to control the primary current of the permanent-magnet type synchronous motor 31. When the integral switching signal SW is 0, the integrating calculation is abandoned and only the proportional calculation is executed. With such processing, the integrating calculation is abandoned only when the motor is rotating at a high speed in a regenerative state to prevent a decrease in the stability of the current control system due to the integration calculation. In the other cases, the electric vehicle is provided with a better torque control by executing the normal simple current control calculation.

Figure 13:
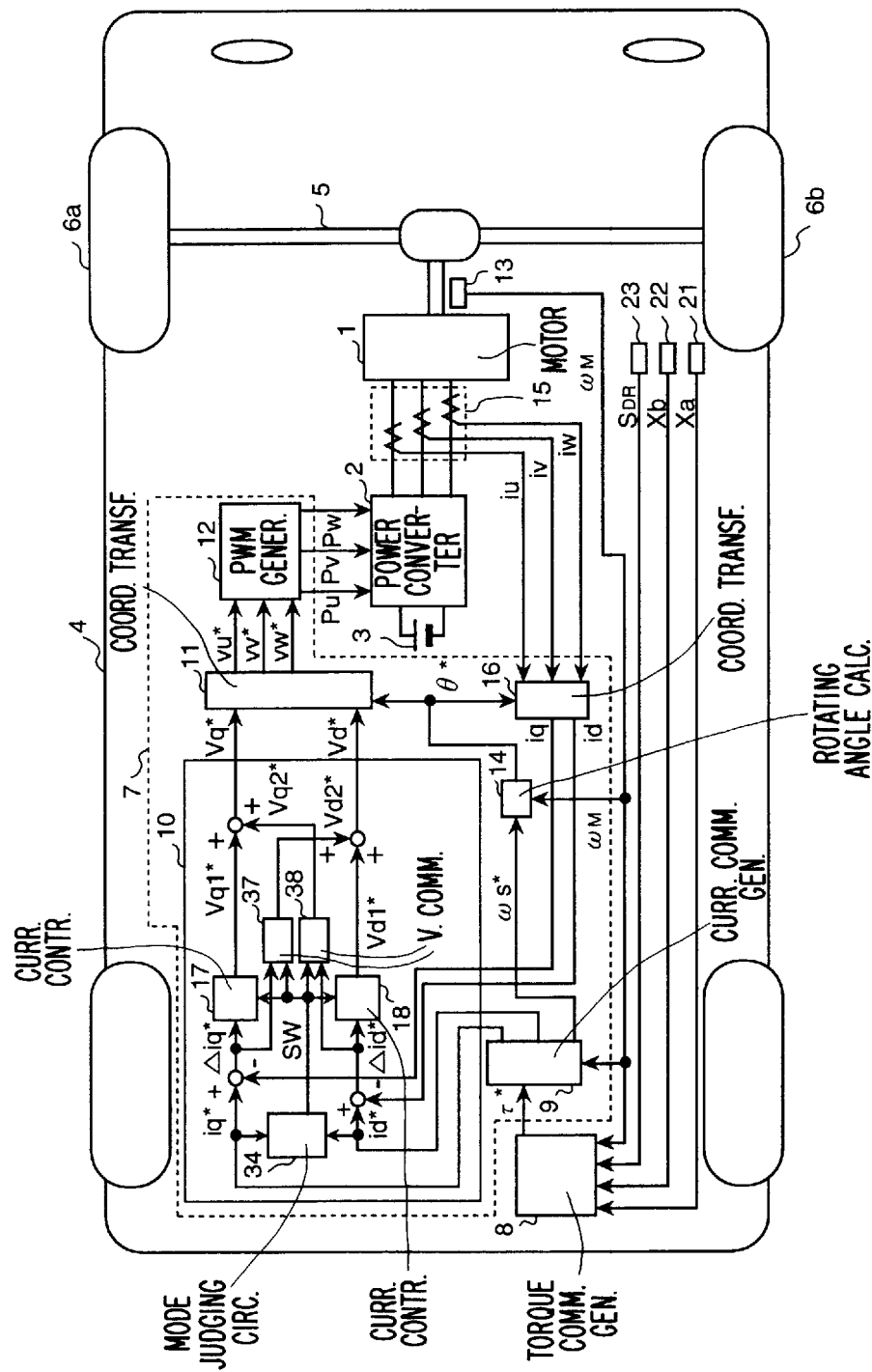
FIG. 13 is a schematic diagram of a control circuit for an electric vehicle mounting another embodiment of a controller in accordance with the present invention in which the calculating method of integration is switched when the vehicle runs in a regenerative state under a weak magnetic field control.
Figure 14:
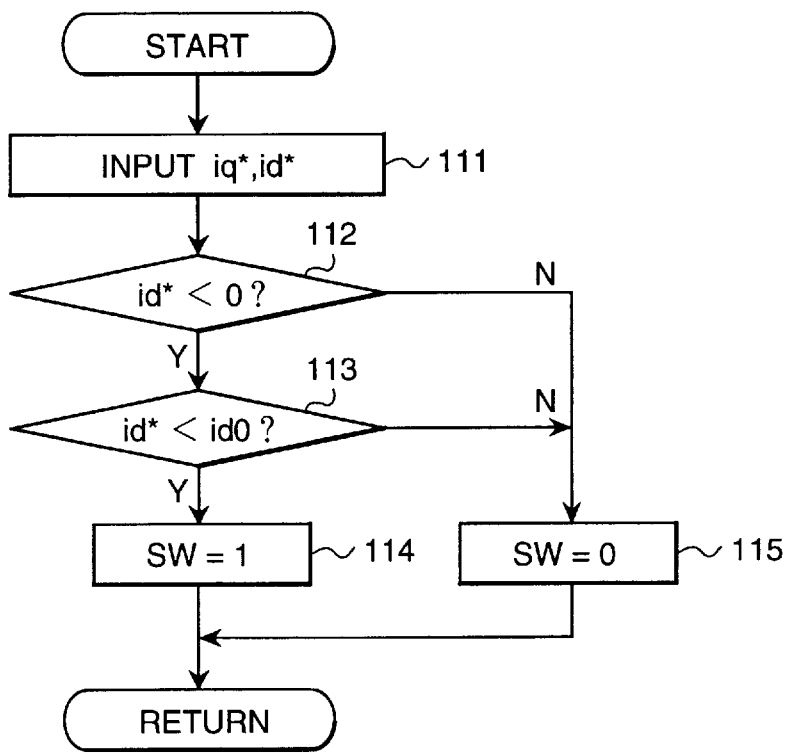
FIG. 14 is a flow chart of an operation for judging whether a condition is in a regenerative state and a weak magnetic field control state in a mode judging circuit.
Figure 15:
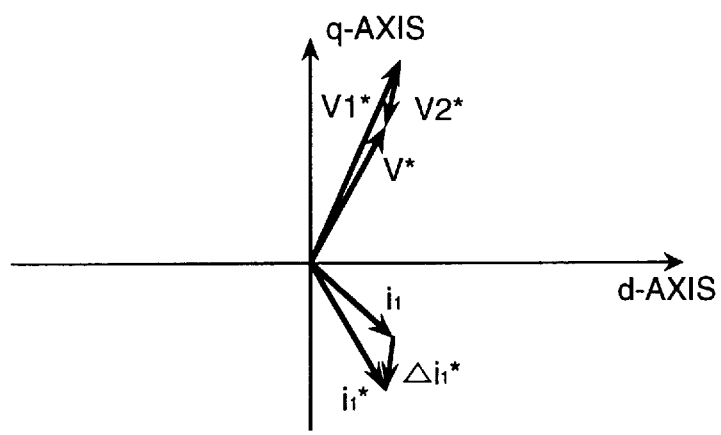
FIG. 15 is a vector diagram showing the relationship between a voltage phase and a current phase when an electric vehicle performs regenerative running using a conventional current control method.

FIG. 13 shows another embodiment of a controller in which the calculating method of integration is switched. A different point from the embodiment of FIG. 12 is a processing method of the mode judging circuit 34 in the control circuit 10. The q-axis current control circuit 17 and the d-axis current control circuit 18 perform current feedback control through proportional integral calculation. The mode judging circuit 34 receives the d-axis current command value $i_{d*}$ and the d-axis current command value $i_{d*}$ obtained from the current command generating circuit 9, and determines the state of the integral switching signal SW by judging whether the running mode of the electric vehicle is in a regenerative state and a weak magnetic field state or not. The content of this calculation is shown in the flow chart of FIG. 14. The signals are input in Step 111, and in Step 112 it is judged whether the q-axis current command value $i_{q*}$ is negative or not. If $i_{q*}$ is negative, the processing proceeds to Step 113 since the running mode is judged to be in a regenerative state. If $i_{q*}$ is positive or 0 (zero), the integral switching signal SW is set to 0 (zero) in Step 115 since the running mode is judged to be not in a regenerative state.

In Step 113, the d-axis current command value $i_{d*}$ is compared with a preset weak magnetic field judging value $i_{d0}$. If $i_{d*}$ is larger than $i_{d0}$, by judging that the running mode is not in a weak magnetic field state, the integral switching signal SW is set to 0 (zero) in Step 115. If $i_{d*}$ is not larger than $i_{d0}$, by judging that the running mode is in a weak magnetic field state, the integral switching signal SW is set to 1 (one) in Step 114. That is, when the running mode of the electric vehicle is judged to be in a regenerative state and a weak magnetic field state, the integral switching signal SW is set to 1 (one). The integral switching signal SW is output from the mode judging circuit 34 to the q-axis current control circuit 17, the d-axis current control circuit 18, the second d-axis voltage command circuit 37 and the second q-axis voltage command circuit 38. When the integral switching signal SW is 0 (zero), the q-axis current control circuit 17 and the d-axis current control circuit 18 execute an integral calculation, and the second d-axis voltage command circuit 37 and the second q-axis voltage command circuit 38 perform no integral calculation. When the integral switching signal SW is 1 (one), the q-axis current control circuit 17 and the d-axis current control circuit 18 perform no integral calculation, and the second d-axis voltage command circuit 37 and the second q-axis voltage command circuit 38 execute an integral calculation. By using the integral switching signal SW in such a way, only when the running mode of the electric vehicle is in a regenerative state and a weak magnetic field state will the second d-axis voltage command circuit 37 and the second q-axis voltage command circuit 38 execute a calculation to prevent the stability of the current control system from decreasing. When the other states occur, the load on the microcomputer used for control can be reduced.

Therefore, since the stability of the current control system can be maintained and the microcomputer can afford to use diagnostics of the control system or the like by employing this embodiment, there is an advantage in that the reliability of the system can be further improved.

Although the embodiments of the present invention in different cases of using an induction motor or a synchronous motor have been described, some of the embodiments may be combined. Further, although the description has been made of some of the methods to vary the direction of the applied voltage added to the current difference, other methods may be applied as far as the methods vary the direction of the applied voltage based on information concerning the driving state of the alternating current motor. Although the internal elements of the controller 7 are expressed as circuits in the above embodiments, it should be understood that the circuits may be realized by a software process in the microcomputer as well as by analog circuits and/or digital circuits. Further, although the description has referred to a battery as the electric power source, the present invention may be applied to a case where electric power is provided using a generator.

According to the aforementioned embodiments, stable current control can be attained even when the running mode of the electric vehicle is in a regenerative state and a weak magnetic field state, and there is an effect in that it is possible to provide an electric vehicle controller small in size and capable of always driving at high efficiency. Especially, the electric vehicle controller is effective for a vehicle which runs on a descending load for a long time period. Further, since the electric vehicle controller can input an applied voltage to be generated to each current in feed-forward, there is an effect in that the acceleration characteristic of the electric vehicle can be improved.

According to the present invention, since the d-axis voltage and the q-axis voltage are corrected by calculating a correcting d-axis voltage and a correcting q-axis voltage from the d-axis current difference and the q-axis current difference by a vector phase based on a driven state of the alternating current motor, the current control system is capable of stably performing current control even in the face of a load disturbance and/or during regenerating running.

Further, since the electric vehicle controller can input an applied voltage to be generated to each current in feed-forward, the acceleration characteristic of the electric vehicle can be improved.

What is claimed is:

1. An electric vehicle controller comprising an alternating current motor for driving a vehicle, an electric power converter for generating electric power supplied to said alternating current motor, a current command value generator for calculating a d-axis current command value and a q-axis current command value which is perpendicular to said d-axis current command value for generating a magnetic field of said alternating current motor, and a current controller for controlling said electric power converter by feeding back a d-axis current value and a q-axis current value which is perpendicular to said d-axis current value of said alternating current motor and calculating a d-axxis voltage command value utilizing a d-axis current difference between said d-axis current command value and said d-axis current value and calculating a q-axis voltage command value utilizing a q-axis current difference between said q-axis current command value and said q-axis current value, respectively, wherein said current controller comprises voltage vector correcting means for correcting said d-axis voltage command value and said q-axis voltage command value by calculating a correct d-axis voltage command value and a correct q-axis voltage command value from said d-axis current difference and said q-axis current difference using a vector phase based on a driven state of said alternating current motor.

2. An electric vehicle controller according to claim 1, further including means for varying said vector phase based on a primary frequency of said electric power converter.

3. An electric vehicle controller according to claim 1, wherein an applied voltage and a primary current are divided into d-axis components and q-axis components, respectively, and said vector phase is obtained from multiplication of each of said applied voltage components with each of said primary current components.

4. An electric vehicle controller according to claim 1, wherein said vector phase is obtained from a phase difference between an applied voltage and a primary current of said alternating current motor.

5. An electric vehicle controller according to any one of claim 3 and claim 4, wherein said applied voltage is estimated from said d-axis voltage command value and said q-axis voltage command value.

6. An electric vehicle controller according to any one of claim 3 and claim 4, wherein said primary current is estimated from said d-axis voltage command value and said q-axis voltage command value.

7. An electric vehicle controller according to claim 1, wherein said correct d-axis voltage command value and said correct q-axis voltage command value are calculated through integration calculation.

8. An electric vehicle controller according to claim 1, wherein said vector phase is set to a value within the range of 0 degree to 90 degrees.

9. An electric vehicle controller according to claim 1, which further comprises a non-interference control circuit for calculating a reference q-axis voltage value utilizing said d-axis current command value and a reference d-axis voltage value utilizing said q-axis current command value, and for adding said reference q-axis voltage value to said d-axis current command value and said reference d-axis voltage value to said q-axis current command value.

10. An electric vehicle controller comprising an alternating current motor for driving a vehicle, an electric power converter for generating electric power supplied to said alternating current motor, a current command value generator for calculating a d-axis current command value and a q-axis current command value which is perpendicular to said d-axis current command value for generating a magnetic field of said alternating current motor, and a current controller for controlling said electric power converter by feeding back a d-axis current value and a q-axis current value which is perpendicular to said d-axis current value of said alternating current motor and calculating a d-axis voltage command value from a d-axis current difference between said d-axis current command value and said d-axis current value and calculating a q-axis voltage command value from a q-axis current difference between said q-axis current command value and said q-axis current value, respectively, wherein said current controller comprises voltage correcting means for calculating a correct q-axis voltage command value utilizing said d-axis current difference and a correct d-axis voltage command value utilizing said q-axis current difference, thereby correcting said q-axis voltage command value and said d-axis voltage command value.

11. An electric vehicle controller according to claim 10, wherein said correct d-axis voltage command value and said correct q-axis voltage command value are calculated by integrating said d-axis current difference and said q-axis current difference, respectively.

12. An electric vehicle controller according to claim 11, wherein a gain of said integration varies depending on an applied voltage and a phase difference of the primary current of said alternating current motor.

13. An electric vehicle controller according to claim 11, wherein said correct q-axis voltage command value and said correct d-axis voltage command value are obtained by integrating said d-axis current difference and said q-axis current difference and multiplying the results of the integration by a primary angular frequency of said electric power converter, respectively.

14. An electric vehicle controller according to claim 10, wherein a reference q-axis voltage value is calculated using said d-axis current command value and a reference d-axis voltage value is calculated using said q-axis current command value, and said reference q-axis voltage value is added to said d-axis current command value and said reference d-axis voltage value is added to said q-axis current command value.

15. An electric vehicle controller comprising an alternating current motor for driving a vehicle, an electric power converter for generating electric power supplied to said alternating current motor, a current command value generator for calculating a d-axis current command value and a q-axis current command value which is perpendicular to said d-axis current command value for generating a magnetic field of said alternating current motor, and a current controller for controlling said electric power converter by feeding back a d-axis current value and a q-axis current value which is perpendicular to said d-axis current value of said alternating current motor and calculating a d-axis voltage command value utilizing a d-axis current difference between said d-axis current command value and said d-axis current value and calculating a q-axis voltage command value utilizing a q-axis current difference between said q-axis current command value and said q-axis current value through proportional calculation and integral calculation, respectively, wherein said current controller includes means for switching the integral calculation method to any one of a first calculating method of correcting said d-axis voltage command value by integrating said d-axis current difference value and correcting said q-axis voltage command value by integrating said q-axis current difference and a second calculating method of not performing integration corresponding to an operating state of the alternating current motor.

16. An electric vehicle controller according to claim 15, wherein said current controller switches the integral calculation method to any one of said first calculating method and said second calculating method when the operating state of the alternating current motor is a regenerative operating state.

17. An electric vehicle controller according to claim 15, wherein said current controller switches the integral calculation method to any one of said first calculating method and said second calculating method when the operating state of the alternating current motor is a regenerative and high speed operating state.

18. An electric vehicle controller according to claim 15, wherein said current controller switches the integral calculation method to any one of said first calculating method and said second calculating method when the operating state of the alternating current motor is a regenerative operating state and said d-axis current command value is decreased to perform weak magnetic field control.

19. An electric motor controller comprising an alternating current motor for driving a vehicle, an electric power converter for generating electric power supplied to said alternating current motor, a current command value generator for calculating a d-axis current command value and a q-axis current command value which is perpendicular to said d-axis current command value for generating a magnetic field of said alternating current motor, and a current controller for controlling said electric power converter by feeding back a d-axis current value and a q-axis current value which is perpendicular to said d-axis current value of said alternating current motor and calculating a d-axis voltage command value utilizing a d-axis current difference between said d-axis current command value and said d-axis current value and calculating a q-axis voltage command value utilizing a q-axis current difference between said q-axis current command value and said q-axis current value, respectively, wherein said current controller comprises voltage vector correcting means for correcting said d-axis voltage command value and said q-axis voltage command value by calculating a correct d-axis voltage command value and a correct q-axis voltage command value from said d-axis current difference and said q-axis current difference using a vector phase based on a driven state of said alternating current motor.

20. An electric motor controller according to claim 19, further including means for varying said vector phase based on a primary frequency of said electric power converter.

21. An electric motor controller according to claim 19, wherein an applied voltage and a primary current are divided into d-axis components and q-axis components, respectively, and said vector phase is obtained from multiplication of each of said applied voltage components with each of said primary current components.

22. An electric motor controller according to claim 19, wherein said vector phase is obtained from a phase difference between an applied voltage and a primary current of said alternating current motor.

23. An electric motor controller according to any one of claim 21 and claim 22, wherein said applied voltage is estimated from said d-axis voltage command value and said q-axis voltage command value.

24. An electric motor controller according to any one of claim 21 and claim 22, wherein said primary current is estimated from said d-axis voltage command value and said q-axis voltage command value.

25. An electric motor controller according to claim 19, wherein said correct d-axis voltage command value and said correct q-axis voltage command value are calculated through integration calculation.

26. An electric motor controller according to claim 19, wherein said vector phase is set to a value within the range of 0 degree to 90 degrees.

27. An electric motor controller according to claim 19, which further comprises a non-interference control circuit for calculating a reference q-axis voltage value utilizing said d-axis current command value and a reference d-axis voltage value utilizing said q-axis current command value, and for adding said reference q-axis voltage value to said d-axis current command value and said reference d-axis voltage value to said q-axis current command value.

28. An electric motor controller comprising an alternating current motor for driving a vehicle, an electric power converter for generating electric power supplied to said alternating current motor, a current command value generator for calculating a d-axis current command value and a q-axis current command value which is perpendicular to said d-axis current command value for generating a magnetic field of said alternating current motor, and a current controller for controlling said electric power converter by feeding back a d-axis current value and a q-axis current value which is perpendicular to said d-axis current value of said alternating current motor and calculating a d-axis voltage command value from a d-axis current difference between said d-axis current command value and said d-axis current value and calculating a q-axis voltage command value from a q-axis current difference between said q-axis current command value and said q-axis current value, respectively, wherein said current controller comprises voltage correcting means for calculating a correct q-axis voltage command value utilizing said d-axis current difference and a correct d-axis voltage command value utilizing said q-axis current difference, thereby correcting said q-axis voltage command value and said d-axis voltage command value.

29. An electric motor controller according to claim 28, wherein said correct d-axis voltage command value and said correct q-axis voltage command value are calculated by integrating said d-axis current difference and said q-axis current difference, respectively.

30. An electric motor controller according to claim 29, wherein a gain of said integration varies depending on an applied voltage and a phase difference of the primary current of said alternating current motor.

31. An electric motor controller according to claim 29, wherein said correct q-axis voltage command value and said correct d-axis voltage command value are obtained by integrating said d-axis current difference and said q-axis current difference and multiplying the results of the integration by a primary angular frequency of said electric power converter, respectively.

32. An electric motor controller according to claim 28, wherein a reference q-axis voltage value is calculated using said d-axis current command value and a reference d-axis voltage value is calculated using said q-axis current command value, and said reference q-axis voltage value is added to said d-axis current command value and said reference d-axis voltage value is added to said q-axis current command value.

33. An electric motor controller comprising an alternating current motor for driving a vehicle, an electric power converter for generating electric power supplied to said alternating current motor, a current command value generator for calculating a d-axis current command value and a q-axis current command value which is perpendicular to said d-axis current command value for generating a magnetic field of said alternating current motor, and a current controller for controlling said electric power converter by feeding back a d-axis current value and a q-axis current value which is perpendicular to said d-axis current value of said alternating current motor and calculating a d-axis voltage command value utilizing a d-axis current difference between said d-axis current command value and said d-axis current value and calculating a q-axis voltage command value utilizing a q-axis current difference between said q-axis current command value and said q-axis current value through proportional calculation and integral calculation, respectively, wherein said current controller includes means for switching the integral calculation method to any one of a first calculating method of correcting said d-axis voltage command value by integrating said d-axis current difference value and correcting said q-axis voltage command value by integrating said q-axis current difference and a second calculating method of not performing integration corresponding to an operating state of the alternating current motor.

34. An electric motor controller according to claim 33, wherein said current controller switches the integral calculation method to any one of said first calculating method and said second calculating method when the operating state of the alternating current motor is a regenerative operating state.

35. An electric motor controller according to claim 33, wherein said current controller switches the integral calculation method to any one of said first calculating method and said second calculating method when the operating state of the alternating current motor is a regenerative and high speed operating state.

36. An electric motor controller according to claim 33, wherein said current controller switches the integral calculation method to any one of said first calculating method and said second calculating method when the operating state of the alternating current motor is a regenerative operating state and said d-axis current command value is decreased to perform weak magnetic field control.

* * * * *